(12) United States Patent
Watanabe et al.

(10) Patent No.: US 12,141,723 B2
(45) Date of Patent: Nov. 12, 2024

(54) SITE MANAGEMENT SYSTEM

(71) Applicant: HITACHI CONSTRUCTION MACHINERY CO., LTD., Tokyo (JP)

(72) Inventors: Hiroshi Watanabe, Tsuchiura (JP); Seiya Kato, Tsuchiura (JP); Eiji Egawa, Tsuchiura (JP); Tsuyoshi Fujita, Tsuchiura (JP); Masami Kamibayashi, Tokyo (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 291 days.

(21) Appl. No.: 17/274,795

(22) PCT Filed: Feb. 25, 2020

(86) PCT No.: PCT/JP2020/007277
§ 371 (c)(1),
(2) Date: Mar. 10, 2021

(87) PCT Pub. No.: WO2020/202896
PCT Pub. Date: Oct. 8, 2020

(65) Prior Publication Data
US 2022/0051150 A1   Feb. 17, 2022

(30) Foreign Application Priority Data

Mar. 29, 2019 (JP) ................ 2019-066223

(51) Int. Cl.
*G06Q 10/0631* (2023.01)
*E02F 9/24* (2006.01)
*E02F 9/26* (2006.01)

(52) U.S. Cl.
CPC ........ *G06Q 10/0631* (2013.01); *E02F 9/24* (2013.01); *E02F 9/26* (2013.01); *G06Q 10/063114* (2013.01)

(58) Field of Classification Search
CPC ... G06Q 10/063114; G06Q 50/08; E02F 9/24; E02F 9/2054
See application file for complete search history.

(56) References Cited

U.S. PATENT DOCUMENTS

| 6,469,628 B1 * | 10/2002 | Richards | ................ G01S 13/76 340/573.3 |
| 9,037,125 B1 * | 5/2015 | Kadous | ................ H04W 4/027 455/418 |

(Continued)

FOREIGN PATENT DOCUMENTS

JP   2012-526497 A   10/2012

OTHER PUBLICATIONS

Jo et al., "Proximity Warning and Excavator Control System for Prevention of Collision Accidents," Sustainability 2017, 9, 1488.*

(Continued)

*Primary Examiner* — Renae Feacher
(74) *Attorney, Agent, or Firm* — MATTINGLY & MALUR, PC

(57) ABSTRACT

A site management system is provided with a server that acquires information about a construction machine and a construction machine operator at a construction site through a communication channel, and manages work conditions at the construction site. The server includes an information registration unit that acquires and registers position information, acceleration data, and gyro data of the construction machine and the construction machine operator, and a riding determination unit that determines a proximity state between the construction machine and the construction machine operator from the position information of the construction machine and the construction machine operator, and determines whether or not the construction machine operator is riding the construction machine from the acceleration data (Continued)

and gyro data of the construction machine operator in addition to the proximity state.

4 Claims, 16 Drawing Sheets

(56) References Cited

U.S. PATENT DOCUMENTS

| | | | | |
|---|---|---|---|---|
| 2008/0150751 A1* | 6/2008 | Sala | ................ | G01D 4/00 |
| | | | | 340/870.02 |
| 2008/0275765 A1* | 11/2008 | Kuchar | ................ | G06Q 10/08 |
| | | | | 705/7.42 |
| 2011/0009107 A1 | 1/2011 | Guba et al. | | |
| 2013/0245986 A1* | 9/2013 | Grokop | ................ | G01P 13/00 |
| | | | | 702/141 |
| 2015/0091716 A1* | 4/2015 | Hathaway | ................ | G01S 7/003 |
| | | | | 340/435 |
| 2017/0034320 A1* | 2/2017 | Stewart | ................ | G06F 1/1652 |
| 2017/0147958 A1* | 5/2017 | Hatfield | ................ | G06Q 10/063114 |
| 2018/0357583 A1* | 12/2018 | Guillemette | ................ | G06F 13/4282 |

OTHER PUBLICATIONS

International Search Report of PCT/JP2020/007277 dated Jun. 2, 2020.

* cited by examiner

FIG. 4

| DAILY WORK REPORT |||||
|---|---|---|---|---|
| SITE NAME | SITE ABC || DATE | 2018/xx/xx |
| WORKER NAME | HEAVY MACHINERY OPERATOR A ||||
| HOURS WORKED | 08:00～17:30 || BREAK TIME | 12:10-13:05 |

| | START TIME | END TIME | WORK DETAILS | WORK LOCATION | TARGET HEAVY MACHINERY |
|---|---|---|---|---|---|
| 1 | 8:40 | 12:00 | HEAVY MACHINERY OPERATOR | WORKSITE A | EXCAVATOR A |
| 2 | 12:50 | 15:00 | MANUAL WORK | WORKSITE B | - |
| 3 | 15:00 | 17:30 | HEAVY MACHINERY OPERATOR | WORKSITE B | EXCAVATOR B |
| 4 | | | | | |
| 5 | | | | | |

FIG. 5

| ID | USERNAME | TYPE | ASSIGNED OPERATOR |
|---|---|---|---|
| 1 | HEAVY MACHINERY OPERATOR A | OPERATOR | |
| 2 | SITE SUPERVISOR | WORKER/SUPERVISOR | |
| 3 | EXCAVATOR A | HEAVY MACHINERY | HEAVY MACHINERY OPERATOR A |
| 4 | EXCAVATOR B | HEAVY MACHINERY | HEAVY MACHINERY OPERATOR A |
| 5 | WORKER A | WORKER/SUPERVISOR | |
| | | | |
| | | | |

FIG. 6

| ID | AREA NAME | COORDINATES | TARGET HEAVY MACHINERY |
|----|-----------|-------------|------------------------|
| 1 | WORKSITE A | $a_1(x_1,y_1), a_2(x_2,y_2), \cdots$ | EXCAVATOR A |
| 2 | WORKSITE B | $b_1(x_1,y_1), b_2(x_2,y_2), \cdots$ | EXCAVATOR B |
| ... | | | |
| | | | |
| | | | |

FIG. 7

| ID | HEAVY MACHINERY NAME | AVERAGE TURNING TIME | IDLING VIBRATION PERIOD |
|---|---|---|---|
| 3 | EXCAVATOR A | xxx SECONDS | xxx Hz |
| 4 | EXCAVATOR B | xxx SECONDS | xxx Hz |
|  |  |  |  |
|  |  |  |  |
|  |  |  |  |
|  |  |  |  |
|  |  |  |  |

FIG. 8

| USERNAME | STATUS | DETAILED STATUS | START TIME | END TIME | TARGET HEAVY MACHINERY | TARGET AREA |
|---|---|---|---|---|---|---|
| HEAVY MACHINERY OPERATOR A | OUTSIDE | – | 08:30 | 10:30 | – | |
| HEAVY MACHINERY OPERATOR A | RIDING | TURNING | 10:30 | 12:00 | EXCAVATOR A | WORKSITE A |
| HEAVY MACHINERY OPERATOR A | RIDING | STOPPED | 13:00 | 14:00 | EXCAVATOR B | WORKSITE B |
| HEAVY MACHINERY OPERATOR A | RIDING | TURNING | 14:00 | 16:00 | EXCAVATOR B | WORKSITE B |
| HEAVY MACHINERY OPERATOR A | RIDING | MOVING | 16:00 | 16:30 | EXCAVATOR B | WORKSITE B |
| | | | | | | |
| | | | | | | |

FIG. 12
(a) ACCELERATION DATA
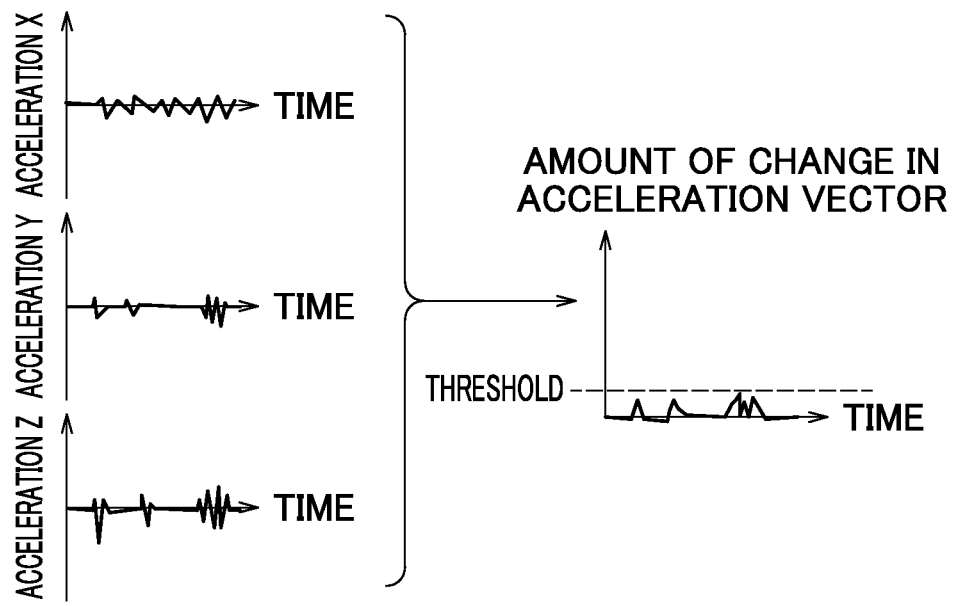
(b) GYRO DATA
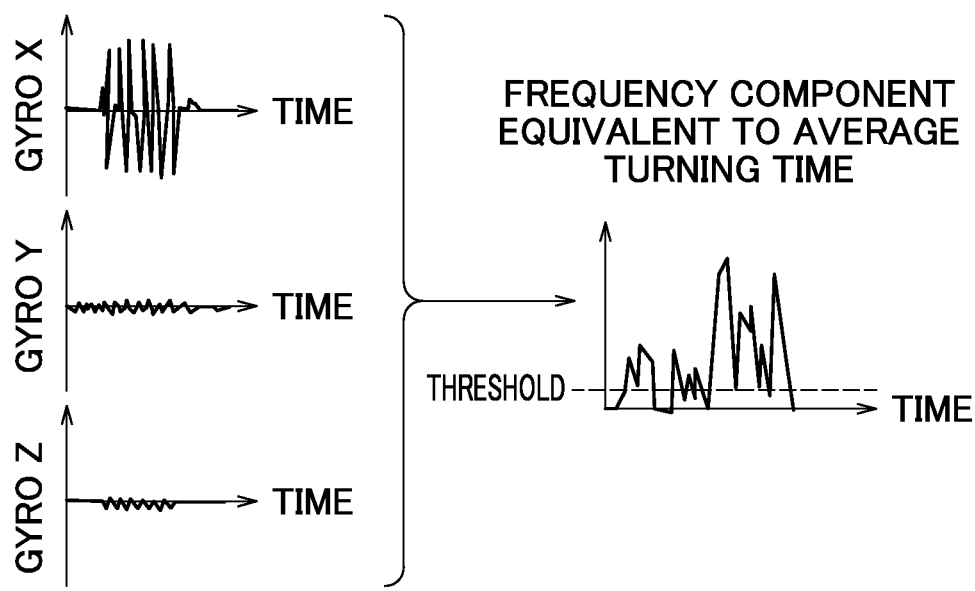

SITE MANAGEMENT SYSTEM

TECHNICAL FIELD

The present invention relates to a site management system at a civil engineering construction site or the like, and more particularly, to technology related to determining a construction machine riding state of a construction machine operator.

BACKGROUND ART

At a civil engineering construction site, construction machines (heavy machinery) such as excavators as well as dump trucks and workers work together as a unit to perform tasks such as digging, transporting soil, shaping earth mounds, and erecting or removing structures, and thereby create works such as embankments or roads. At these sites, the content of the work from day to day is reported in a daily report. At this time, the unit prices for the operation of construction machines and for manual work may be different in some cases, and appropriately recording what kind of work was performed at what time is important. However, it is difficult for the workers themselves to create a daily report by accurately remembering the content of the day's work including the work times, and therefore the work of logging a daily report is supported by IT systems.

Also, at civil engineering construction sites, various processes are in progress at any given time, and at a certain timing, a worker may operate an excavator, while at a different timing, the same worker may exit the excavator and perform manual work. Consequently, in an IT system that creates a daily report, it is important to distinguish whether the work that a worker performed is the work of operating a construction machine or manual work.

Furthermore, one method of distinguishing between the work of operating a construction machine and manual work by a worker is a method of determining whether the worker is aboard the construction machine. For example, Patent Literature 1 discloses performing wireless communication from a dedicated terminal installed in a vehicle, determining that a worker is onboard the vehicle if a mobile terminal within communicable distance exists, and limiting operations that should not be performed on the mobile terminal while onboard. In other words, according to the related art, it is possible to determine whether or not a worker is riding an excavator by causing the worker to carry a mobile terminal.

PRIOR ART DOCUMENT

Patent Document

Patent Document 1: National Publication of International Patent Application No. 2012-526497

SUMMARY OF THE INVENTION

Problems to be Solved by the Invention

However, with the method of the related art, if a work is close enough for wireless communication to be possible, it may be determined that the worker is riding the construction machine even though the worker is not. In contrast, a method of utilizing position information obtained from GPS is also conceivable, but when GPS error is considered, a worker near a construction machine may be determined to be riding the construction machine. In other words, the method of the related art is unable to accurately determine whether a worker is operating a construction machine or performing manual work near the construction machine, and there is a problem in that the reliability of site management is lowered.

The present invention has been devised in light of such problems, and an object thereof is to provide a site management system capable of accurately ascertaining whether a worker at a construction site is operating a construction machine or performing manual work near the construction machine, and thereby achieve reliable site management.

Means for Solving the Problems

In order to achieve the above object, a site management system according to the present invention is a site management system provided with a server that acquires information about a construction machine and a construction machine operator at a construction site through a communication channel, and manages work conditions at the construction site. The server includes an information registration unit that acquires and registers position information, acceleration data, and gyro data of the construction machine and the construction machine operator, and a riding determination unit that determines a proximity state between the construction machine and the construction machine operator from the position information of the construction machine and the construction machine operator, and determines whether or not the construction machine operator is riding the construction machine from the acceleration data and gyro data of the construction machine operator in addition to the proximity state.

Advantageous Effects of the Invention

According to the site management system according to the present invention, whether a worker at a construction site is operating a construction machine or performing manual work near the construction machine can be ascertained accurately, and reliable site management can be achieved.

BRIEF DESCRIPTION OF THE DRAWINGS

FIG. 4 is an explanatory diagram of a daily report in the site management system according to Example 1 of the present invention.

FIG. 5 is a table configuration diagram illustrating user information in the site management system according to Example 1 of the present invention.

FIG. 6 is a table configuration diagram illustrating site information in the site management system according to Example 1 of the present invention.

FIG. 7 is a table configuration diagram illustrating heavy machinery settings in the site management system according to Example 1 of the present invention.

FIG. 8 is a table configuration diagram illustrating riding states in the site management system according to Example 1 of the present invention.

FIG. 12 is a graph illustrating sensor data in the site management system according to Example 1 of the present invention.

MODE FOR CARRYING OUT THE INVENTION

Hereinafter, the drawings will be referenced to describe embodiments of a site management system according to the present invention in detail on the basis of Examples. Note that the present invention is not limited to the content described hereinafter, and modifications may be carried out freely in a scope that does not change the gist of the present invention. Also, the various numerical values used in each Example are all illustrative examples, and may be changed in various ways as needed.

Example 1

Figure 1:
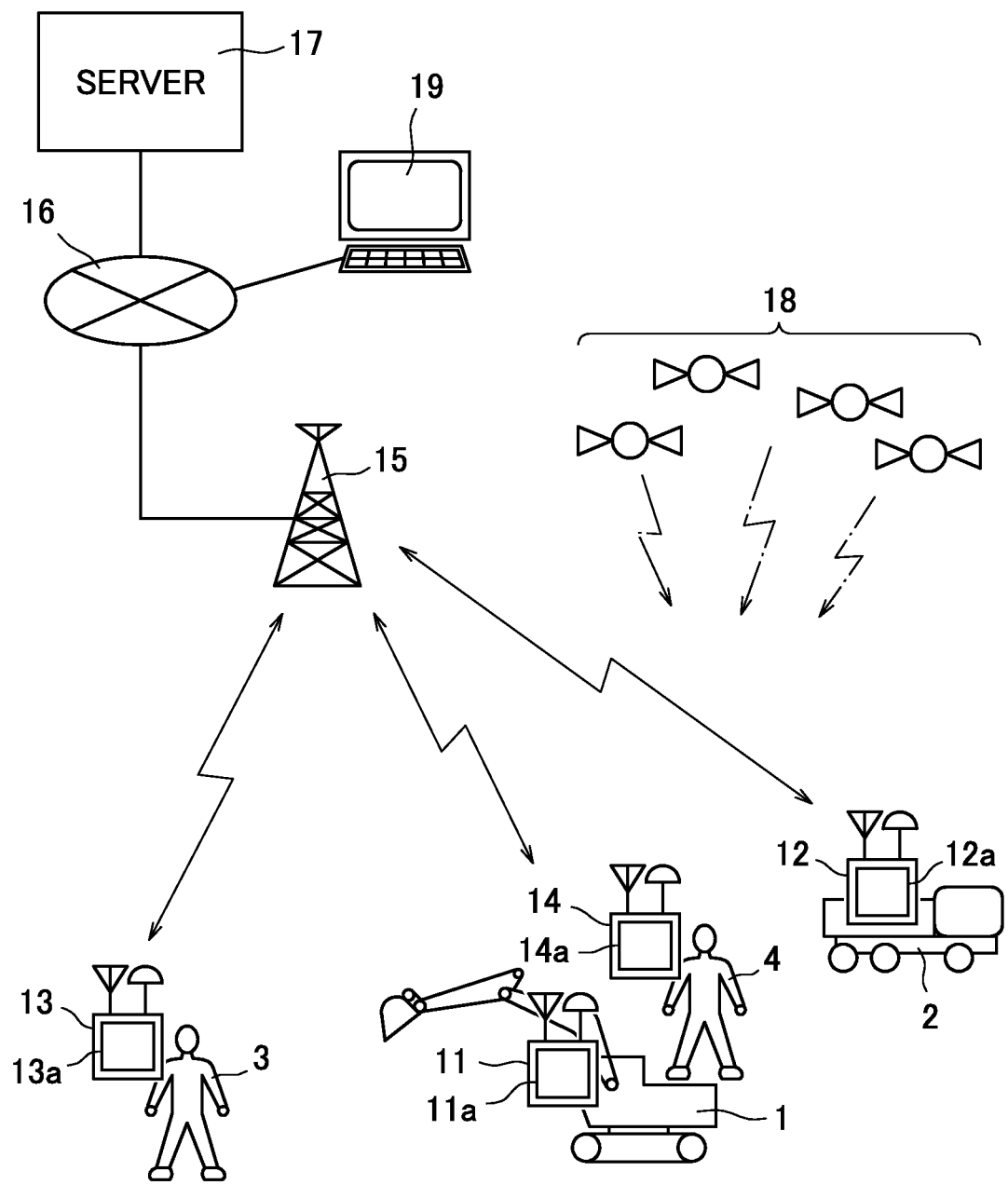
FIG. 1 is a schematic diagram for explaining a system configuration according to Example 1 of the present invention.
Figure 2:
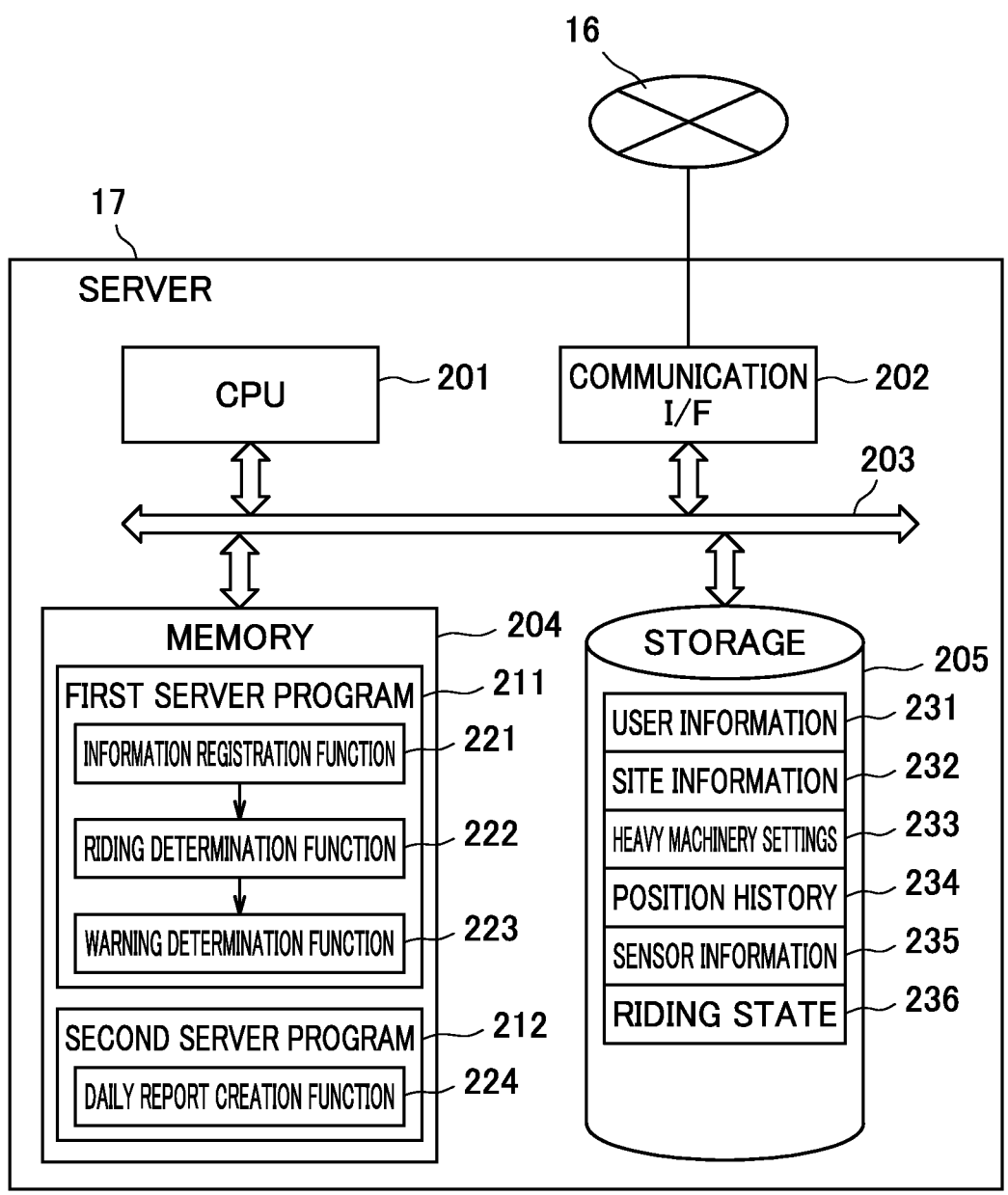
FIG. 2 is a block diagram of a server of a site management system according to Example 1 of the present invention.
Figure 3:
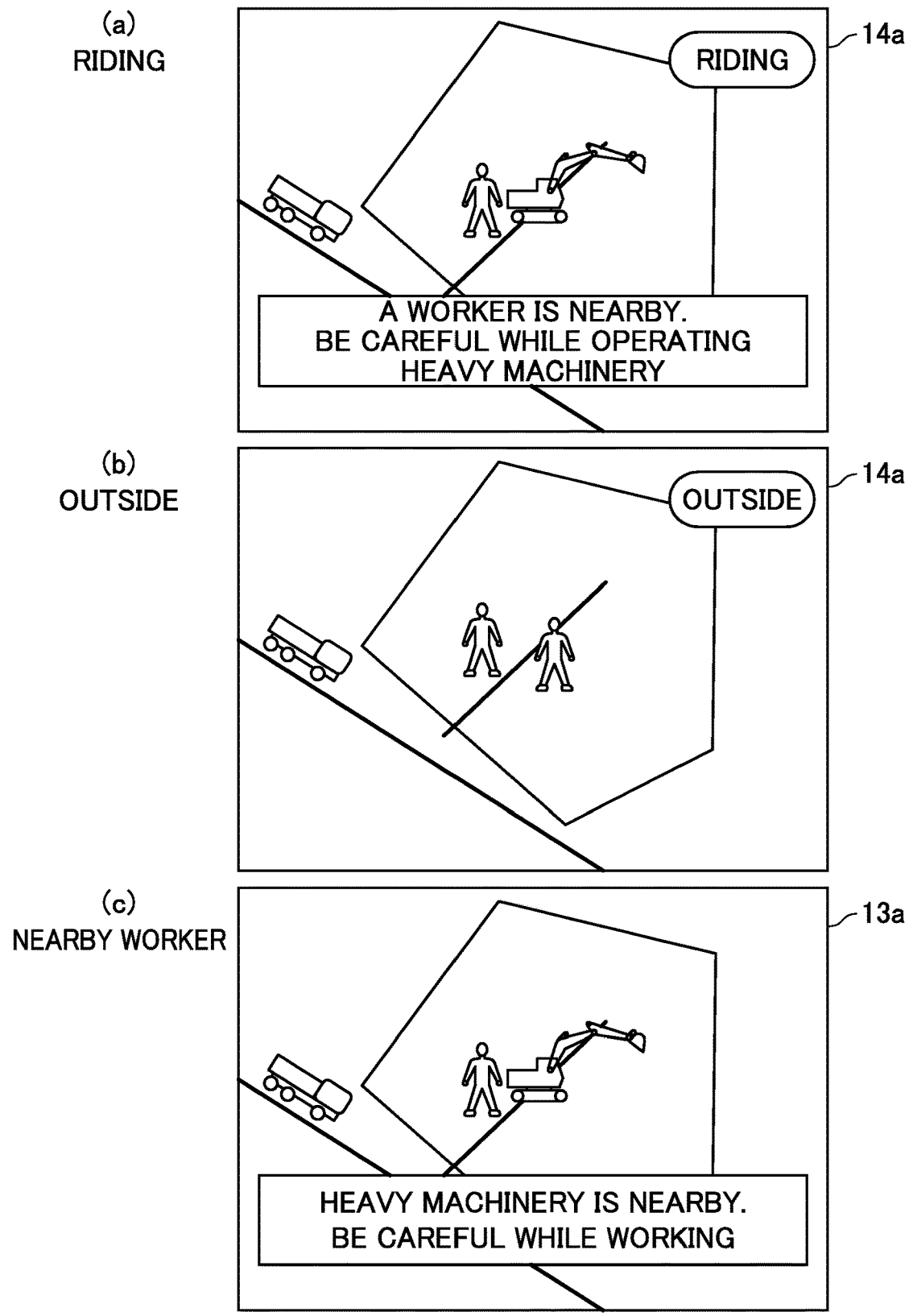
FIG. 3 is an illustration for explaining a proximity warning in the site management system according to Example 1 of the present invention.

Hereinafter, a configuration of a site management system according to the present Example will be described while referring to FIGS. 1 to 8. Here, FIG. 1 is a schematic diagram for explaining a system configuration of a site management system according to the present Example, and FIG. 2 is a block diagram of a server of the site management system according to the present Example. Also, FIG. 3 is an illustration for explaining a proximity warning in the site management system, and FIG. 4 is an explanatory diagram of a daily report in the site management system. Furthermore, FIG. 5 is a table configuration diagram illustrating user information in the site management system, FIG. 6 is a table configuration diagram illustrating site information in the site management system, FIG. 7 is a table configuration diagram illustrating heavy machinery settings in the site management system, and FIG. 8 is a table configuration diagram illustrating riding states in the site management system.

First, as illustrated in FIG. 1, the site management system according to the present Example is assumed to be used at a civil engineering construction site (hereinafter also simply referred to as a civil engineering site or a construction site), the civil engineering site being an environment where heavy machinery 1 such as a hydraulic excavator, a transporting machine 2 such as a dump truck, a worker 3, and an operator 4 who operates the heavy machinery 1 coexist. Here, the heavy machinery 1 refers to a construction machine (work machine) capable of performing loading work with respect to the transporting machine 2, and may be a machine provided with a plurality of work functions in addition to loading work, or a construction machine provided with only other work functions without being provided with a loading work function. Also, the worker 3 refers to a worker who performs manual work and does not operate the heavy machinery 1, and also includes a site supervisor.

The site management system is configured such that position information and sensor information acquired by a communication terminal 11 provided in the heavy machinery 1, a communication terminal 12 provided in the transporting machine 2, a communication terminal 13 carried by the worker 3, and a communication terminal 14 carried by the operator 4 on the site can be transmitted from each communication terminal to a server 17 through a base station 15 and a public communication channel 16.

Additionally, as common functions, each communication terminal has a function of measuring its own position by means of using a satellite positioning system 18 such as GPS and a function of transmitting position information and sensor information such as acceleration data and gyro data by means of communicating with the server 17. Particularly, in the present Example, each communication terminal measures its own position information and periodically transmits the position information, speed data, acceleration data, and gyro data, and an ID for identifying itself to the server 17. In the present Example, the communication terminal 11 provided in the heavy machinery 1 and the communication terminal 12 provided in the transporting machine 2 on the site are assumed to be dedicated onboard terminals or the like that can be used by being connected to a cigarette lighter socket, while the communication terminal 13 carried by the worker 3 and the communication terminal 14 carried by the operator 4 are assumed to be smartphones. Note that although the present Example assumes the satellite positioning system 18, each communication terminal may also use another positioning method using beacons or the like to measure its own position.

Also, each communication terminal includes a display for displaying various information. Specifically, the communication terminal 11 includes a display 11a, the communication terminal 12 includes a display 12a, the communication terminal 13 includes a display 13a, and the communication terminal 14 includes a display 14a.

The present Example assumes a case where each communication terminal and the server 17 are connected via a mobile phone base station 15 and the public communication channel 16 using a wireless band for mobile phones. However, the entire system may also be set up inside the construction site, the server 17 may be installed on an intranet inside the construction site, and each communication terminal and the server 17 may communicate by using wireless LAN inside the construction site.

Also, as illustrated in FIG. 1, in the site management system according to the present Example, an operation terminal 19 used for oversight by an administrator of the civil engineering construction site is provided outside the civil engineering construction site. Additionally, the operation terminal 19 is provided with a communication device (not illustrated), and therefore can connect to the server 17 through the public communication channel 16. Consequently, the administrator who operates the operation terminal 19 is able to access the server 17 through the public communication channel 16, cause the status of work at the civil engineering construction site to be displayed on the operation terminal 19, and check the content thereof. Particularly, in the present Example, the administrator is able to use the operation terminal 19 to edit the settings of each communication terminal and the server 17, and refer to daily reports stored in the server 17.

The operation terminal 19 is assumed to be a device such as a typical PC, tablet, or smartphone, and is capable of performing operations on the server 17 by using a dedicated application or a web browser. In FIG. 1, the communication terminal 13 carried by the worker and the operation terminal 19 are described as different terminals, but in the case where the site supervisor uses a smartphone as the communication terminal 13, it is also possible to use the smartphone as the operation terminal 19.

With regard to the hardware and software configuration of the server 17, the server 17 includes a CPU 201, a communication I/F 202, memory 204, storage 205, and an internal bus 203 for connecting the above, as illustrated in FIG. 2. Note that in FIG. 2, the storage 205 and the CPU 201 for executing programs are provided inside a single server 17, but the storage 205 may also be treated as an independent database server.

The CPU 201 executes a first server program 211 for registration and a second server program 212 for daily report acquisition. Also, the first server program 211 and the second server program 212 are loaded into the memory 204. User information 231, site information 232, heavy machinery settings 233, a position history 234, sensor information 235, and a riding state 236 are stored in the storage 205.

The first server program 211 includes an information registration function (information registration unit) 221, a riding determination function (riding determination unit) 222, and a warning determination function (warning determination unit) 223. When the server 17 receives information such as position information and sensor information from each communication terminal, the server 17 executes the first server program 211 to register the received information in the position history 234 and the sensor information 235. In other words, the received position information and sensor information is registered in the position history 234 and the sensor information 235 by the information registration function 221 of the first server program 211.

Also, when information is registered in the position history 234 and the sensor information 235, if the user carrying the communication terminal is the operator 4 of the heavy machinery 1, the first server program 211 determines whether the operator 4 is riding or outside the heavy machinery 1, and the riding state 236 is updated. In other words, a riding determination and an update of the riding state 236 are performed by the riding determination function 222 of the first server program 211.

Additionally, on the basis of the updated information in the riding state 236, the first server program 211 determines whether or not a worker is near predetermined heavy machinery, and issues a warning if necessary. In other words, the warning determination function 223 of the first server program 211 acquires updated information from the riding state 236, on the basis of the information determines whether or not the worker 3 is near the heavy machinery 1 and also determines the necessity of a warning.

In the present Example, there are three patterns of warnings like those illustrated in FIG. 3. Specifically, FIG. 3(a) is a screen displayed on the display 14a of the communication terminal 14 carried by the operator 4 in the case where the operator 4 is riding the heavy machinery 1 and the worker 3 has approached close to the heavy machinery 1. As illustrated in FIG. 3(a), an indication of riding is displayed in the upper-right corner of the screen, while the heavy machinery 1 and the worker 3 in a nearby state each other are displayed in the center of the screen. Additionally, as illustrated in FIG. 3(a), content prompting attention with the message "A worker is nearby. Be careful while operating heavy machinery" (in other words, a warning) is displayed at the bottom of the screen. With this arrangement, the operator 4 is able to grasp the possibility of contact between the heavy machinery 1 and the worker 3 beforehand, and drive the heavy machinery 1 carefully.

FIG. 3(b) is a screen displayed on the display 14a of the communication terminal 14 carried by the operator 4 in the case where the operator 4 is not riding the heavy machinery 1 and the heavy machinery 1 is not running. As illustrated in FIG. 3(b), an indication of being outside is displayed in the upper-right corner of the screen, while the worker 3 and the operator 4 in a nearby state each other are displayed in the center of the screen. In this case, the operator 4 is in a state similar to the worker 3 and is not operating the heavy machinery 1, and therefore a warning related to contact with the worker 3 like in FIG. 3(a) is not displayed.

FIG. 3(c) is a screen displayed on the display 13a of the communication terminal 13 carried by the worker 3 in the case where the worker 3 is near the heavy machinery 1 while running. As illustrated in FIG. 3(c), the heavy machinery 1 and the worker 3 in a nearby state each other are displayed in the center of the screen. Also, as illustrated in FIG. 3(c), content prompting attention with the message "Heavy machinery is nearby. Be careful while working" (in other words, a warning) is displayed at the bottom of the screen. With this arrangement, the worker 3 is able to grasp the possibility of himself or herself contacting the heavy machinery 1 beforehand, and perform manual work carefully.

The second server program 212 includes a daily report creation function 224. When a daily report acquisition is requested from the operation terminal 19, the second server program 212 is executed to create a daily report of the work by the operator 4 of the heavy machinery from the information of the riding state 236, and the created daily report is transmitted to the operation terminal 19. In other words, the daily report creation function 224 of the second server program 212 creates a daily work report and also supplies the created daily work report to the operation terminal 19 through the public communication channel 16.

As illustrated in FIG. 4, the created daily work report includes "Site Name", "Date", "Worker Name", "Hours Worked", and "Break Time" fields. Also, the daily work report includes "Disclosure Time", "End Time", "Work Details", "Start Time", and "Target Heavy Machinery" fields for each of various types of work. Heavy Machinery Operator or Manual Work is input into the Work Details field, and the name of the heavy machinery (for example, the excavator name) used is input into the "Target Heavy Machinery" field.

The user information 231 in the storage 205 is data preregistered in the server 17. Also, which heavy machinery 1 at the site each communication terminal is mounted on or which person (the worker 3 or the operator 4) is carrying each communication terminal is set in the user information 231. Furthermore, information related to the heavy machinery or person (type and parameters) is set. Additionally, an operator of heavy machinery who may possibly ride and operate the heavy machinery is set as information related to the heavy machinery.

Specifically, as illustrated in FIG. 5, the user information 231 includes "ID", "Username", "Type", and "Assigned Operator" fields. The ID is an identifier for uniquely identifying each user, and normally consecutive numerals are used. The Username is the name of each user, in which the heavy machinery operator, site supervisor, worker, or heavy machinery name is registered. The Type indicates the type of each user, and is divided into the three types of heavy machinery, worker/supervisor, and operator who operates heavy machinery but also works as a worker/supervisor. In the Assigned Operator field, the name of an operator who may possibly ride and operate heavy machinery is registered in related to a user for which "Heavy Machinery" is registered in the Type field.

The site information 232 in the storage 205 is also data preregistered in the server 17. Particularly, a work area inside the construction site and the heavy machinery expected to be operated in the corresponding area are set in the site information 232. Specifically, as illustrated in FIG. 6, the site information 232 includes "ID", "Area Name", "Coordinates", and "Target Heavy Machinery" fields. The ID is an identifier for uniquely identifying each area, and normally consecutive numerals are used. In the Area Name field, the name of each set area is registered. In the Coordinates field, coordinates for indicating the range of each area are registered. For example, in the case where the area is a polygon, the latitude and longitude of each vertex is registered in the Coordinates field. Note that the setting of an area is not limited to a polygon, and therefore various settings may be set appropriately, such as using a center point and a radius to define a circle. In the Target Heavy Machinery field, the name of the heavy machinery to be operated in the corresponding area is registered.

The heavy machinery settings 233 in the storage 205 is also data preregistered in the server 17. Particularly, in the heavy machinery settings 233, parameters such as the time taken to complete an average turn and the vibration pattern when starting the engine are set for the heavy machinery to be operated at the construction site. Specifically, as illustrated in FIG. 7, the heavy machinery settings 233 includes "ID", "Heavy Machinery Name", "Average Turning Time", and "Idling Vibration Period" fields. The ID is an identifier for uniquely identifying each heavy machinery, and the same value as the ID in the user information 231 is registered. In the Heavy Machinery Name field, the name of the corresponding heavy machinery, that is the same value as the Username in the user information is registered. In the Average Turning Time field, the turning time taken on average in the case where the heavy machinery turns during a loading operation or the like at the site is registered. For example, numerical data in units of seconds is registered. In the Idling Vibration Period field, the period of vibrations detected in the cab of the heavy machinery while the engine is running is registered. For example, the period is registered as numerical data in units of hertz.

The position history 234 in the storage 205 is data registered continually by the first server program 211. Specifically, in the position history 234, position information transmitted from each communication terminal is registered in association with each of the communication terminals. Additionally, the sensor information 235 in the storage 205 is also data registered continually by the first server program 211. Specifically, in the sensor information 235, information (speed data, acceleration data, and gyro data) acquired by various sensors provided in each communication terminal is registered in association with each of the communication terminals.

The riding state 236 in the storage 205 is data updated continually by the first server program 211. In the riding state 236, an indication of whether the operator 4 has been riding or outside the heavy machinery 1, or in other words, a history of riding the heavy machinery, is registered. Specifically, as illustrated in FIG. 8, the riding state 236 includes "Username", "Status", "Detailed Status", "Start Time", "End Time", "Target Heavy Machinery", and "Target Area" fields. In the Username field, the operator name of the operator driving the heavy machinery is registered. In the Status field, an indication of whether or not the corresponding user is riding the heavy machinery, namely "Riding" or "Outside" is registered. In the Detailed Status field, a more detailed status of the heavy machinery is registered. For example, in the case where the Status field is "Riding", one of "Turning", "Stopped", or "Moving" is registered in the Detailed Status field. On the other hand, in the case where the Status field is "Outside", "-" is displayed to indicate that no particular value is registered. In the Start Time field, the time at which the corresponding Status started is registered, while in the End Time field, the time at which the corresponding Status ended is registered. In the Target Heavy Machinery field, the name of the heavy machinery that the target operator actually operates is registered, and in the Target Area field, the name of an area where the target operator is actually working is registered.

Figure 9:
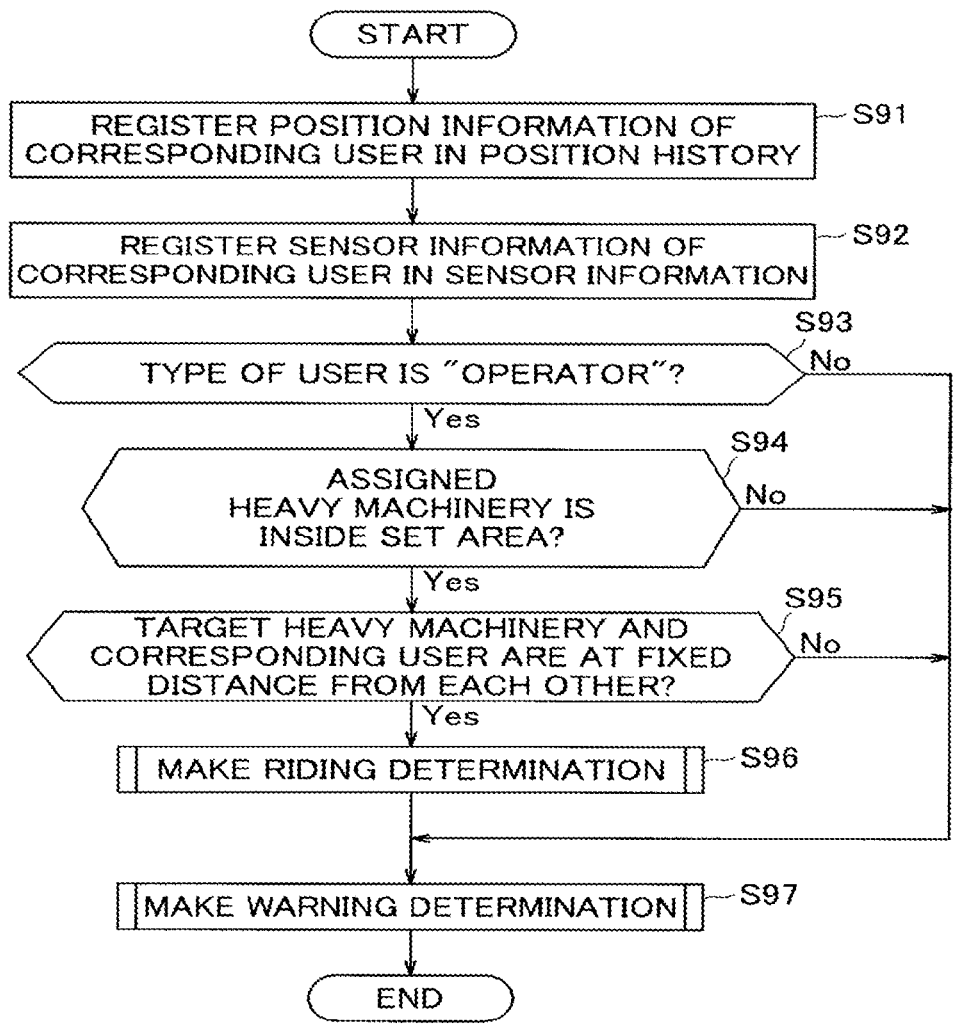
FIG. 9 is a flowchart during data registration in the site management system according to Example 1 of the present invention.

Next, FIG. 9 will be referenced to describe a management flow by the site management system according to the present Example. Here, FIG. 9 is a flowchart during data registration in the site management system according to the present Example.

First, when an ID for identification of a communication terminal, position information, and sensor information are received from each communication terminal, the server 17 executes the first server program 211, and the process is started by the information registration function 221. Specifically, the received position information is registered in the position history 234 in the storage 205 by the information registration function 221 (step S91). Also, the received sensor information is registered in the sensor information 235 in the storage 205 by the information registration function 221 (step S92). In other words, position information and sensor information are registered in the position history 234 and the sensor information 235 for the corresponding user who is the subject carrying the communication terminal that transmitted the position information and the sensor information. Note that step S91 and step S92 may also be performed simultaneously or in reverse order.

Next, from the received ID of the communication terminal, the server 17 determines whether or not the type of the user acting as the source of the information is "Operator" (step S93). Specifically, the CPU 201 references the user information 231 in the storage 205, extracts information registered in the Type field corresponding to the received ID of the communication terminal, and determines whether or not the type of the user is "Operator".

Next, in the case where the type of the user acting as the source of the information is "Operator" (step S93: Yes), the server 17 determines whether or not the assigned heavy machinery is inside the set area (step S94). Specifically, the CPU 201 references the user information 231 in the storage 205, and extracts the information registered in the Username field corresponding to the received ID of the communication terminal 14. Thereafter, the CPU 201 extracts the username of the heavy machinery for which the extracted username is registered in the "Assigned Operator" field of the user information 231. Next, the CPU 201 references the site information 232 in the storage 205 and extracts the area name for which the extracted username of the heavy machinery is registered in the Target Heavy Machinery field. Additionally, the CPU 201 uses the position information received from the communication terminal 11 and information related to the area name to determine whether or not the target heavy machinery (that is, the heavy machinery 1) is inside the area.

For example, the CPU 201 extracts "Heavy Machinery Operator A" having the ID "1" in the user information 231. After that, the CPU 201 extracts "Excavator A" and "Excavator B" to which "Heavy Machinery Operator A" is assigned. Next, the CPU 201 extracts "Worksite A" and "Worksite B" for which "Excavator A" or "Excavator B" is registered in the Target Heavy Machinery field from the site information 232. Additionally, the CPU 201 compares the received position information of the communication terminal 11 to the extracted information of "Worksite A" or "Worksite B", and determines whether the target excavator is at "Worksite A" or Worksite B".

Next, in the case where the assigned heavy machinery is inside the set area (step S94: Yes), it is determined whether or not the target heavy machinery and the corresponding user (in this flow, the operator 4) are at a fixed distance from each other (step S95). Specifically, the CPU 201 determines whether or not the relative distance is within a fixed value by checking the position information of the target heavy machinery extracted in step S94 and the corresponding user from the position history 234. In other words, the CPU 201 detects that the target heavy machinery extracted in step S94 and the corresponding user are in close proximity, and there is a possibility that the corresponding user is riding the target heavy machinery.

Next, in the case where the target heavy machinery and the corresponding user are at a fixed distance from each other (step S95: Yes), a riding determination is made (step S96). Specifically, whether or not the operator is riding the target heavy machinery is determined by the riding determination function 222 of the first server program 211. Note that a specific determination flow will be described later.

Additionally, in the case where the type of the user acting as the source of the information (step S93: No), the case where the assigned heavy machinery is not inside the set area (step S94: No), the case where the target heavy machinery and the corresponding user are not at a fixed distance from each other (step S95: No), and the case where the riding determination ends (step S96), a warning determination is made (step S97). Specifically, whether or not it is necessary to issue a warning through each communication terminal is determined by the warning determination function 223 of the first server program 211. Note that a specific determination flow will be described later.

Through the above steps, the management flow during data registration in the site management system ends.

Figure 10:
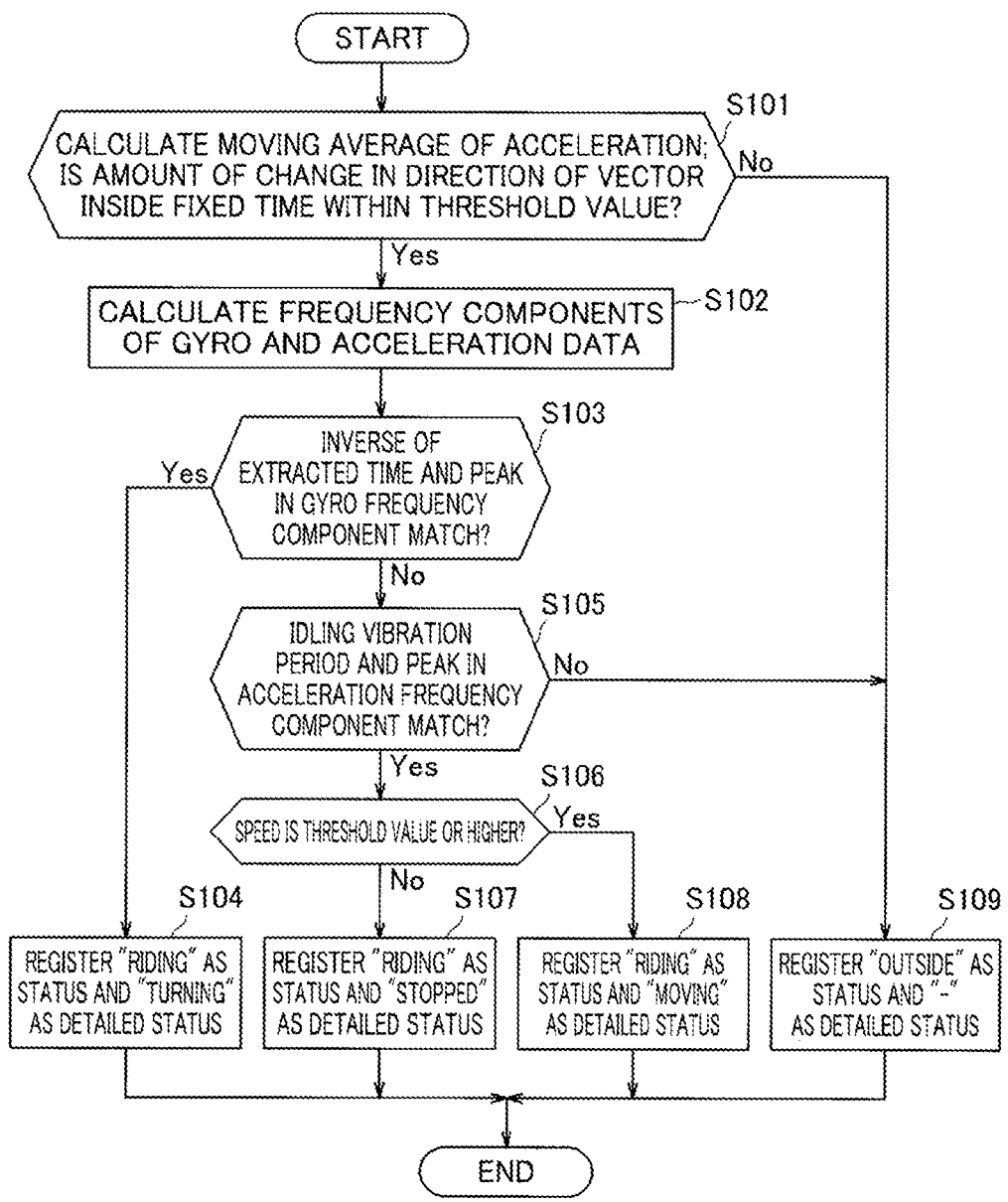
FIG. 10 is a flowchart of riding determination in the site management system according to Example 1 of the present invention.
Figure 11:
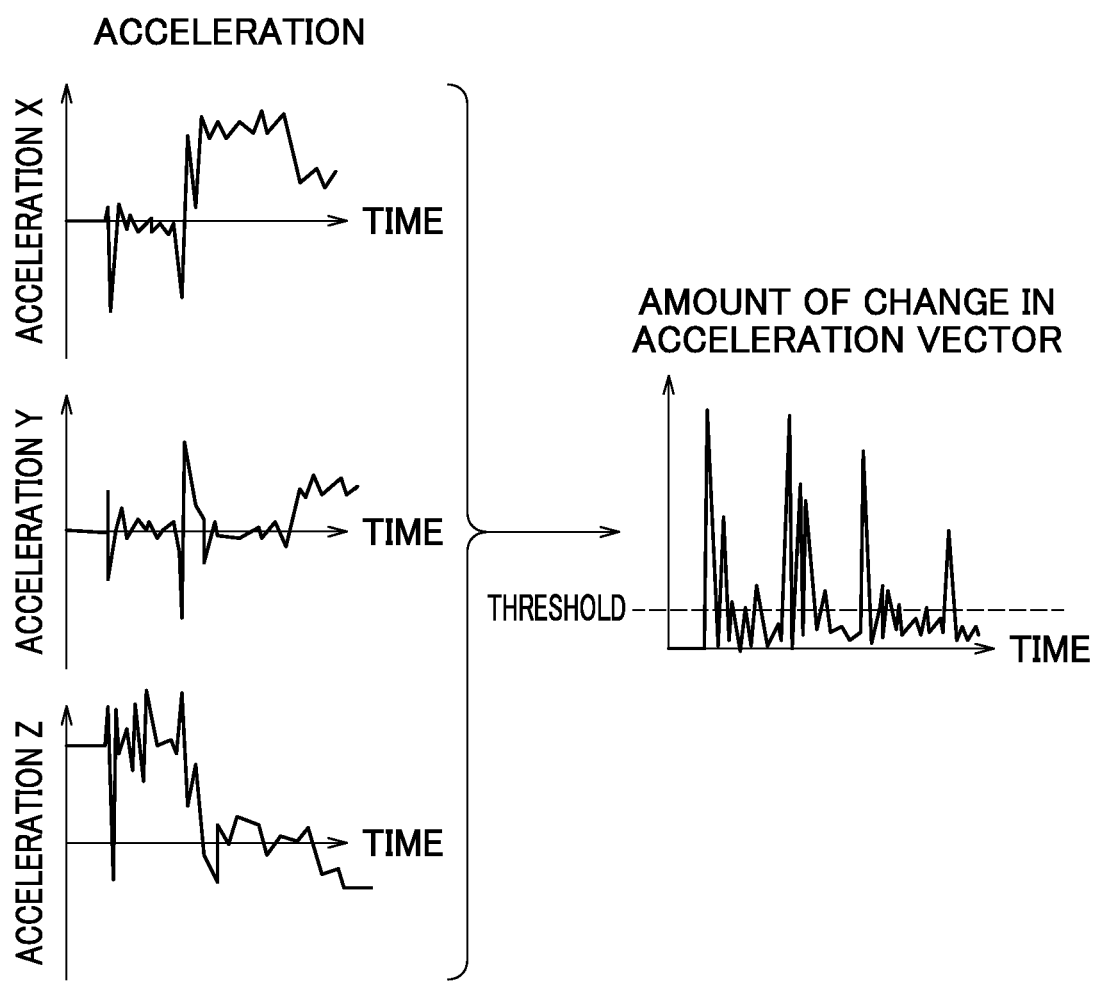
FIG. 11 is a graph illustrating sensor data in the site management system according to Example 1 of the present invention.

Next, FIGS. 10 to 12 will be referenced to describe a determination flow related to the riding determination by the site management system according to the present Example. Here, FIG. 10 is a flowchart of riding determination in the site management system according to the present Example. Also, FIGS. 11 and 12 are graphs illustrating sensor data in the site management system according to the present Example.

First, by causing the CPU 201 to execute the first server program 211 (namely, the riding determination function 222), a moving average of the acceleration information from the sensor information 235 is calculated, and it is determined whether the amount of change in the direction of the vector inside a fixed time is a threshold value or less (step S101). Here, in the case where the operator 4 has exited the heavy machinery 1 and is performing desired manual work, the acceleration obtained by the communication terminal 14 varies greatly, as illustrated in FIG. 11. In other words, the amount of change in an acceleration vector calculated from an X-direction acceleration X, a Y-direction acceleration Y, and a Z-direction acceleration Z increases. This is because the operator 4 is continuing to perform desired movements in the up-and-down, left-and-right, and forward-and-back directions.

On the other hand, in the case where the operator 4 gets onboard the heavy machinery 1 and is performing desired heavy machinery operations, the acceleration obtained by the communication terminal 14 does not vary greatly, as illustrated in FIG. 12(a). In other words, the amount of change in an acceleration vector calculated from an X-direction acceleration X, a Y-direction acceleration Y, and a Z-direction acceleration Z decreases. This is because the operator 4 is sitting in the seat of the heavy machinery, and is moving little in the up-and-down, left-and-right, and forward-and-back directions.

Next, in the case where the amount of change is the threshold value or less (step S101: Yes, FIG. 12(a)), a delimited frequency component is calculated for each fixed time with respect to the gyro information and the acceleration information of the sensor information 235 (step S102). Here, as illustrated in FIG. 12, the gyro information has a trend corresponding to whether or not the heavy machinery 1 is turning, and corresponds to a turn of the heavy machinery 1 in the case where the intensity of the frequency component corresponding to the average turn time varies greatly from the gyro information in each direction.

Next, the riding determination function 222 extracts the average turn time of the target heavy machinery from the heavy machinery settings 233, and determines whether the frequency that is the inverse of the extracted time matches a peak in the gyro frequency component calculated in step S102 (step S103). In the case where the frequency and the peak match (step S103: Yes), the riding determination function 222 registers "Riding" as the status and "Turning" as the detailed status in the riding state 236 in the storage 205 (step S104). More specifically, the Username field of the riding state 236 is searched to find information about the corresponding user, and the information for which the most recent information is registered in the End Time field is retrieved by the search. In the case where "Riding" is registered in the Status field and "Turning" is registered in the Detailed Status field of the information retrieved as the search result, the End Time field is updated to the current time. On the other hand, in the case where "Riding" is not registered in the Status field and "Turning" is not registered in the Detailed Status field of the information, a new row is created in which the corresponding username is registered in the Username field, "Riding" is registered in the Status field, "Turning" is registered in the Detailed Status field, the current time is registered in the Start Time field, the current time is registered in the End Time field, the username of the heavy machinery detected in step S94 is registered in the Target Heavy Machinery field, and the area name detected in step S94 is registered in the Target Area field. Additionally, the current process flow ends after going through step S104.

In the case where the frequency and the peak value do not match (step S103: No), the riding determination function 222 extracts the idling vibration period of the target heavy machinery from the heavy machinery settings 233, and determines whether the idling vibration period matches a peak in the acceleration frequency component calculated in step S102 (step S105). In the case where the idling vibration period and the peak match (step S105: Yes), the riding determination function 222 determines whether or not the speed of the corresponding user from the sensor information 235 is a threshold value or higher (step S106).

In the case where the speed of the corresponding user is not the threshold value or higher (step S106: No), the riding determination function 222 registers "Riding" as the status and "Stopped" as the detailed status in the riding state 236 in the storage 205 (step S107). More specifically, the Username field of the riding state 236 is searched to find information about the corresponding user, and the information for which the most recent information is registered in the End Time field is retrieved by the search. In the case where "Riding" is registered in the Status field and "Stopped" is registered in the Detailed Status field of the information retrieved as the search result, the End Time field is updated to the current time. On the other hand, in the case where "Riding" is not registered in the Status field and "Stopped" is not registered in the Detailed Status field of the information, a new row is created in which the corresponding username is registered in the Username field, "Riding" is registered in the Status field, "Stopped" is registered in the Detailed Status field, the current time is registered in the Start Time field, the current time is registered in the End Time field, the username of the heavy machinery detected in step S94 is registered in the Target Heavy Machinery field, and the area name detected in step S94 is registered in the Target Area field. Additionally, the current process flow ends after going through step S107.

On the other hand, in the case where the speed of the corresponding user is the threshold value or higher (step S106: Yes), the riding determination function 222 registers "Riding" as the status and "Moving" as the detailed status in the riding state 236 in the storage 205 (step S108). More specifically, the Username field of the riding state 236 is searched to find information about the corresponding user, and the information for which the most recent information is registered in the End Time field is retrieved by the search. In the case where "Riding" is registered in the Status field and "Moving" is registered in the Detailed Status field of the information retrieved as the search result, the End Time field is updated to the current time. On the other hand, in the case where "Riding" is not registered in the Status field and "Moving" is not registered in the Detailed Status field of the information, a new row is created in which the corresponding username is registered in the Username field, "Riding" is registered in the Status field, "Moving" is registered in the Detailed Status field, the current time is registered in the Start Time field, the current time is registered in the End Time field, the username of the heavy machinery detected in step S94 is registered in the Target Heavy Machinery field, and the area name detected in step S94 is registered in the Target Area field. Additionally, the current process flow ends after going through step S108.

Additionally, in the case where the amount of change is greater than the threshold value in step S101 (step S101: No), and in the case where the idling vibration period and the peak do not match in step S105 (step S105: No), the riding determination function 222 registers "Outside" as the status and "-" as the detailed status in the riding state 236 in the storage 205 (step S109). More specifically, the Username field of the riding state 236 is searched to find information about the corresponding user, and the information for which the most recent information is registered in the End Time field is retrieved by the search. In the case where "Outside" is registered in the Status field and "-" is registered in the Detailed Status field of the information retrieved as the search result, the End Time field is updated to the current time. On the other hand, in the case where "Outside" is registered in the Status field and "-" is not registered in the Detailed Status field of the information, a new row is created in which the corresponding username is registered in the Username field, "Outside" is registered in the Status field, the Detailed Status field is left unregistered, the current time is registered in the Start Time field, the current time is registered in the End Time field, the username of the heavy machinery detected in step S94 is registered in the Target Heavy Machinery field, and the area name detected in step S94 is registered in the Target Area field. Additionally, the current process flow ends after going through step S109.

Figure 13:
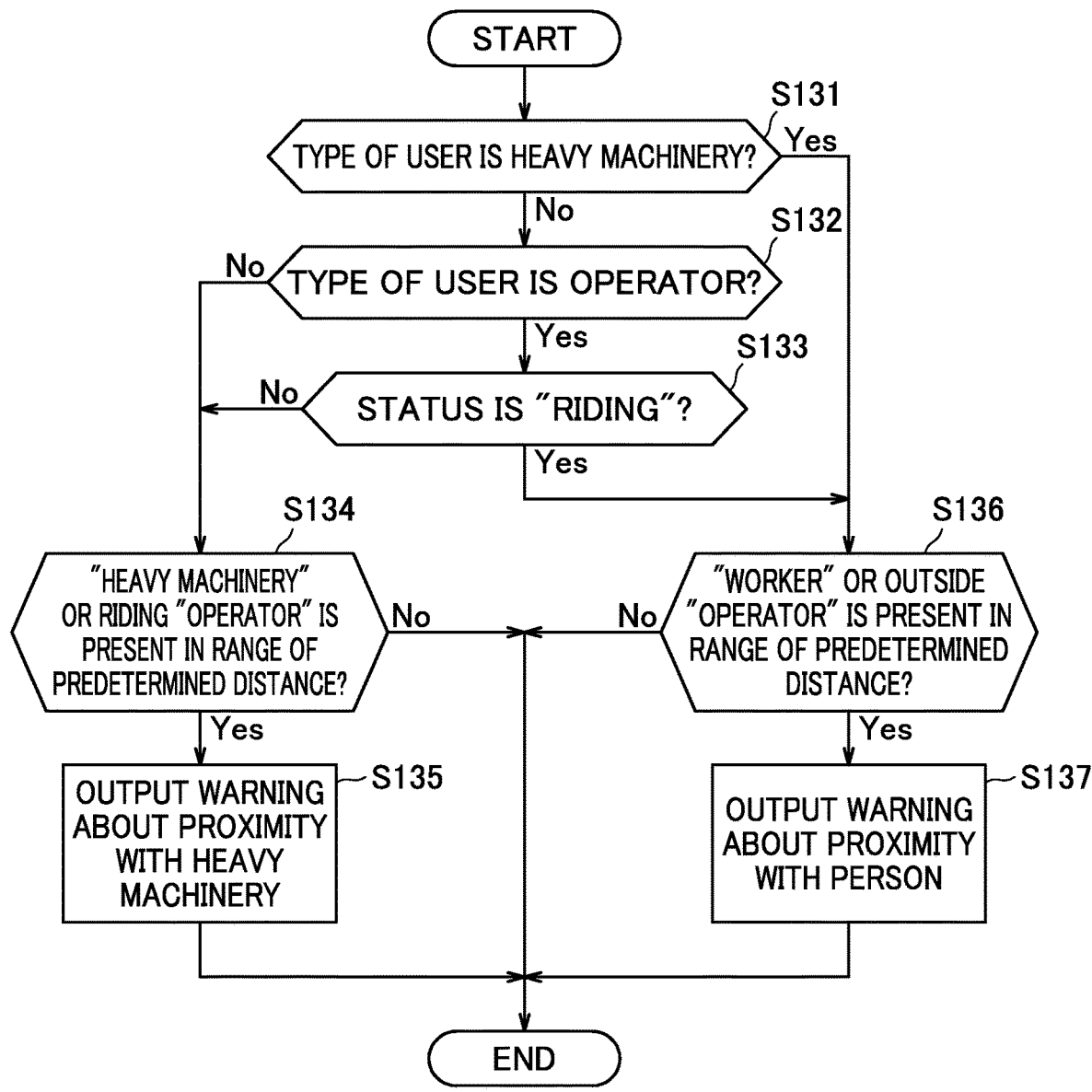
FIG. 13 is a flowchart of warning determination in the site management system according to Example 1 of the present invention.

Next, FIG. 13 will be referenced to describe a determination flow related to the warning determination by the site management system according to the present Example. Here, FIG. 13 is a flowchart of warning determination in the site management system according to the present Example.

First, by causing the CPU 201 to execute the first server program 211 (namely, the warning determination function 223), it is determined from the Type field of the user information 231 whether the corresponding user is "Heavy Machinery" or other than "Heavy Machinery" (step S131). In the case where the corresponding user is other than "Heavy Machinery" (step S131: No), the warning determination function 223 determines from the Type field of the user information 231 whether the corresponding user is "Operator" or other than "Operator" (step S132).

Next, in the case where the corresponding user is "Operator" (step S132: Yes), the warning determination function 223 determines whether or not the operator 4 is riding heavy machinery (step S133). Specifically, the warning determination function 223 searches the Username field of the riding state 236 to find information about the corresponding user, retrieves the most recent information registered in the End Time field, extracts the Status field in the most recent information, and determine whether the status is riding or outside.

Next, in the case where the corresponding user is other than "Operator" (step S132: No) and in the case where the operator 4 is not riding heavy machinery (step S133: No), the warning determination function 223 determines whether or not heavy machinery or a riding operator is present in the range of a predetermined distance (step S134). Specifically, the most recent position information of each user is extracted from the position history 234, and the information whose update time is within a fixed period from the current time is extracted. Additionally, the relative distance between the worker 3 to be warned and the extracted heavy machinery 1 or riding operator 4 is calculated, an operation is performed to determine whether the relative distance is within the range of the predetermined distance, and the presence or absence of the heavy machinery 1 or the riding operator 4 in a predetermined range is determined.

In step S134, if it is determined that the heavy machinery or the riding operator is present in the range of the predetermined distance (step S134: Yes), a warning command is transmitted from the server 17 to the communication terminal 13 of the worker 3, and a warning about proximity with heavy machinery is output on the display 13a of the communication terminal 13 of the worker 3 (step S135). Additionally, the current process flow ends after going through step S135.

In the case where corresponding user is "Heavy Machinery" in step S131 (step S131: Yes) and in the case where the operator 4 is riding the heavy machinery 1 in step S133 (step S133: Yes), the warning determination function 223 determines whether or not the worker 3 or the outside operator 4 is present in the range of a predetermined distance (step S136). Specifically, the most recent position information of each user is extracted from the position history 234, and the information whose update time is within a fixed period from the current time is extracted. Additionally, the relative distance between the riding operator 4 or the heavy machinery 1 to be warned and the extracted worker 3 or the outside operator 4 is calculated, an operation is performed to determine whether the relative distance is within the range of the predetermined distance, and the presence or absence of the worker 3 or the outside operator 4 in a predetermined range is determined.

In step S136, if it is determined that the worker 3 or the outside operator 4 is present in the range of the predetermined distance (step S136: Yes), a warning command is transmitted from the server 17 to the communication terminal 14 of the riding operator 4 or the communication terminal 11 of the heavy machinery 1, and a warning about proximity with person is output on the display 11a or 14a of the communication terminal 11 or 14 (step S137). Additionally, the current process flow ends after going through step S137.

In the case of determining that the heavy machinery 1 or the riding operator 4 is not present in the range of the predetermined distance in step S134 (step S134: No) and in the case of determining that the worker 3 or the outside operator 4 is not present in the range of the predetermined distance in step S136 (step S136: No), the process flow ends without issuing a warning.

Figure 14:
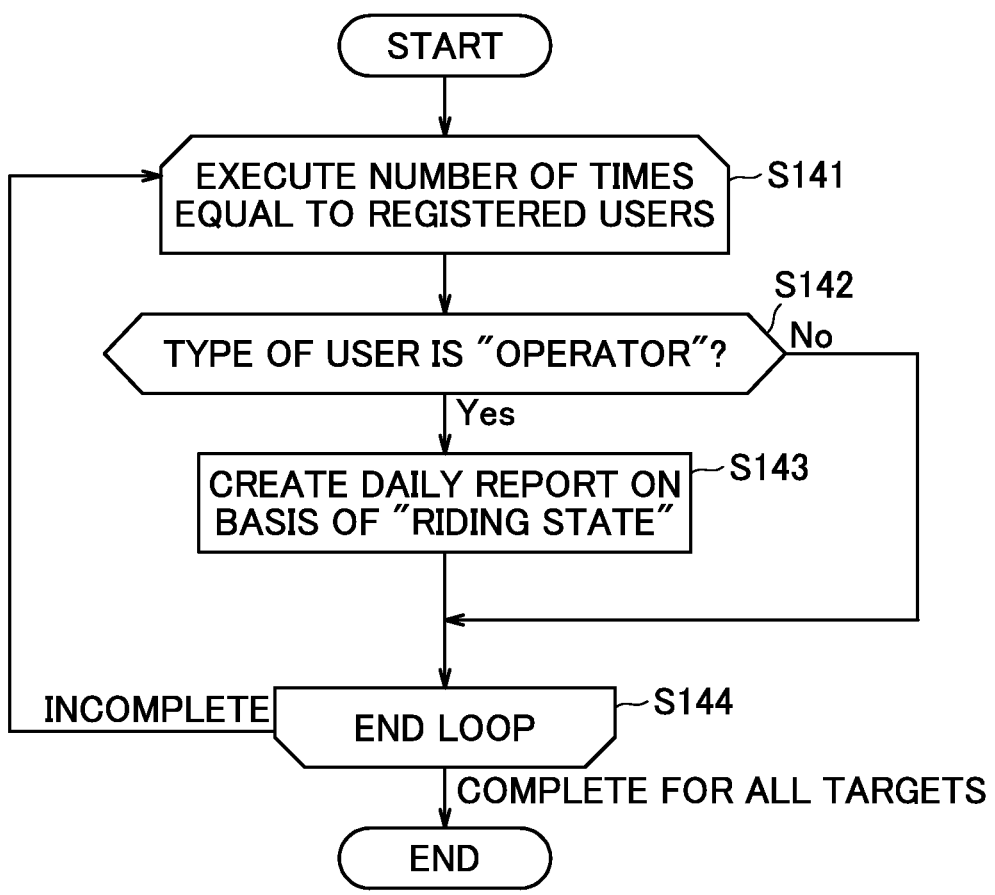
FIG. 14 is a flowchart of daily report creation in the site management system according to Example 1 of the present invention.

Next, FIG. 14 will be referenced to describe a creation flow related to the creation of a daily report by the site management system according to the present Example. Here, FIG. 14 is a flowchart of daily report creation in the site management system according to the present Example.

First, a repeating operation to execute steps S142 and S143 successively for each user registered in the user information 231 is performed (step S141). In step S142, the Type field of the corresponding user is extracted from the user information 231, and in the case where the corresponding user is "Operator", the flow proceeds to step S143. Otherwise, the flow proceeds to step S144.

Next, in step S143, the second server program 212 (namely, the daily report creation function 224) is executed to extract the information of the corresponding user from the Username field of the riding state 236, and the corresponding user is classified on the basis of the "Riding" or "Outside" information in the Status field of the riding state 236. Additionally, the daily report creation function 224 registers the corresponding information in the Start Time field, the End Time field, the Work Details field, the Work Location field, and the Target Heavy Machinery field of the daily work report. Also, the daily report creation function 224 calculates the hours worked from the position history 234, and creates a daily work report.

Next, it is determined whether the processing for all users is complete (step S144). In the case where the processing for all users is incomplete, the flow returns to step S141, and steps S142 to S144 are repeated. On the other hand, in the case where the processing for all users is complete, the loop is exited, the process flow ends, and the daily report creation ends.

As above, in the site management system according to the present Example, the server 17 includes the information registration function 221 that acquires and registers position information, acceleration data, and gyro data of the heavy machinery 1 and the operator 4 of the heavy machinery 1, and the riding determination function 222 that determines a proximity state between the heavy machinery 1 and the operator 4 from the position information of the heavy machinery 1 and the operator 4, and determines whether or not the operator 4 is riding the heavy machinery 1 from the acceleration data and gyro data of the operator 4 in addition to the proximity state. Such a simple configuration of the server 17 makes it possible to make a riding determination according to the properties of motion of the heavy machinery 1 rather than only simple position information, and thereby the accuracy of determining whether the operator is riding or not is improved. In other words, according to the site management system according to the present Example, whether a worker (operator) at a construction site is operating the heavy machinery 1 or performing manual work near the heavy machinery 1 can be grasped accurately by an inexpensive method, and reliable site management can be achieved.

Also, in the present Example, the riding determination function 222 determines whether or not the operator 4 is riding the heavy machinery 1 on the basis of the amount of change in the moving average of the acceleration data of the operator 4. Furthermore, the riding determination function 222 determines whether or not the operator 4 is riding the heavy machinery 1 according to whether or not the frequency component of the gyro data of the operator 4 and the frequency component of the acceleration data of the operator 4 match the frequency of the turning properties and the vibrating properties of the heavy machinery 1. Here, the acceleration data and gyro data of the operator 4 can be acquired easily using the communication terminal 14, and because the turning properties and vibrating properties of the heavy machinery 1 are preregistered, whether or not the operator 4 is riding can be determined with high precision with a relatively simple configuration and process.

Furthermore, the server 17 includes the warning determination function 223 that, in the case of determining that the operator 4 is riding the heavy machinery 1, determines whether or not to issue a warning to the operator 4 regarding proximity with the worker 3 at the construction site. Consequently, a state of proximity between the heavy machinery 1 and the worker 3 can be ascertained precisely, and a competent warning can be issued correctly and inexpensively. In addition, the warning determination function 223 issues the warning not only to the operator 4 but also to the worker 3, thereby further raising the safety level for the construction site as a whole.

Additionally, the server 17 includes a daily report creation function that creates a daily report about the operator 4 on the basis of the position information, acceleration data, and gyro data of the heavy machinery 1 and the operator 4. Consequently, the created daily report can be made to include an indication of whether the operator 4 is riding the heavy machinery 1 and performing driving work or outside the heavy machinery 1 and performing manual work, and the manageability at the construction site can be increased.

Note that although Example 1 is described as detecting and warning about proximity between the heavy machinery 1 and the worker 3, the transporting machine 2 is also provided with the communication terminal 12, and therefore Example 1 may also be configured to detect and warn about proximity between the transporting machine 2 and the worker 3, or configured to detect both types of proximity.

Example 2

Figure 15:
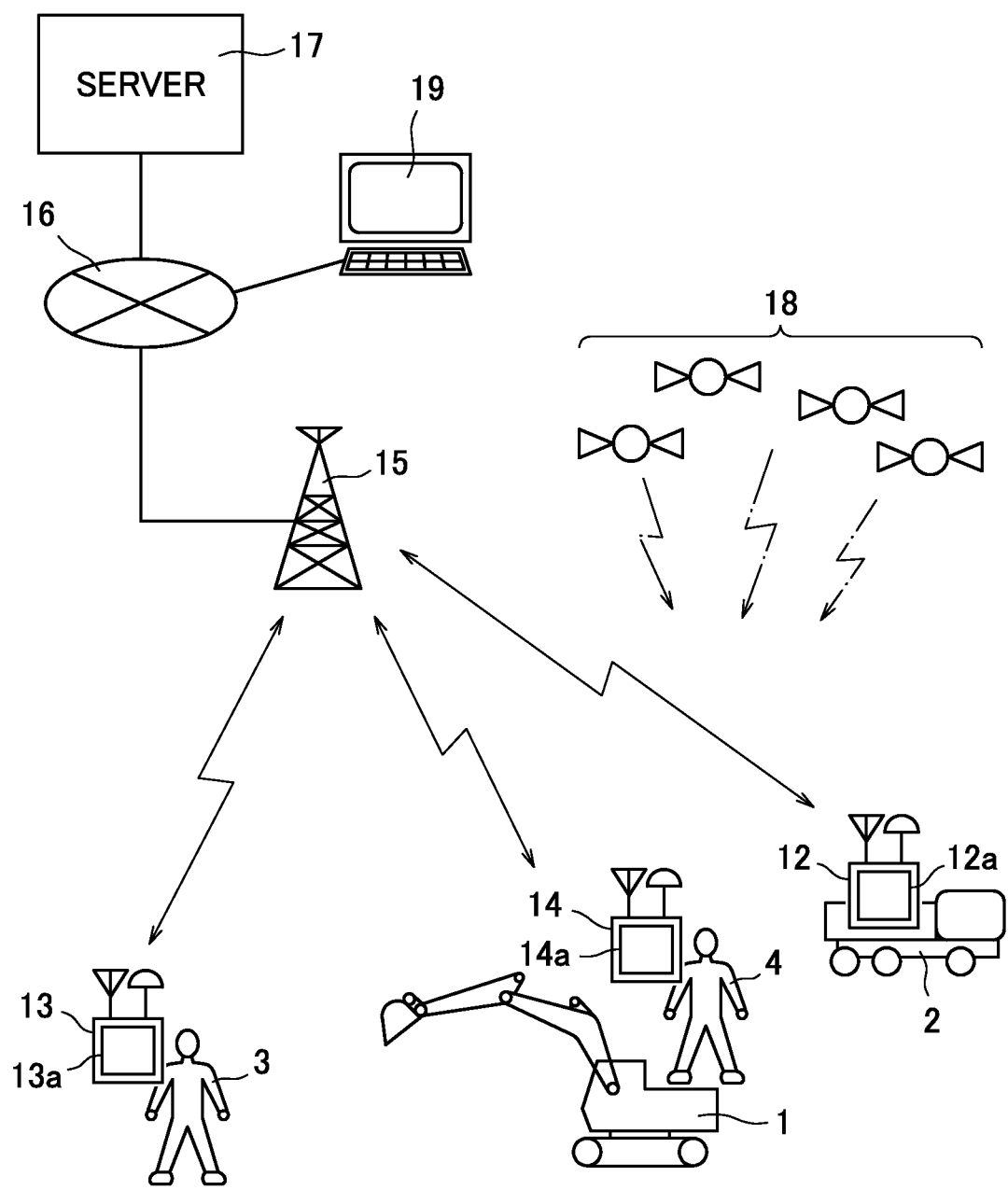
FIG. 15 is a schematic diagram for explaining a system configuration according to Example 2 of the present invention.

Example 1 described above assumes a situation in which the communication terminal 11 is installed in the heavy machinery 1, but Example 2 presupposes a situation in which the communication terminal 11 is not installed in the heavy machinery 1. In other words, the present Example assumes a case where the operator 4 carries around the communication terminal 14 to use. Hereinafter, such a site management system will be described below as Example 2 with reference to FIGS. 15 and 16. Here, FIG. 15 is a schematic diagram for explaining a system configuration according to the present Example. Also, FIG. 16 is a flowchart during data registration in the site management system according to the present Example.

As illustrated in FIG. 15, compared to the site management system according to Example 1, the site management system according to the present Example is different in that the communication terminal 11 is not installed in the heavy machinery 1, but otherwise the configuration is the same. In other words, in Example 2, the hardware, software configuration, and table configuration are similar to Example 1. Also, in Example 2, the flowchart is different only in the process flow during data registration, while the other process flows are similar to Example 1. For this reason, a description of the configurations and flows similar to Example 1 will be omitted.

With such a configuration, in the site management system according to the present Example, real-time position information about the heavy machinery 1 is not supplied to the server 17. On the other hand, where the heavy machinery 1 is to be used is preregistered in the site information 232, and therefore the registered information is utilized to warn the operator 4 of the heavy machinery 1 and the worker 3.

Figure 16:
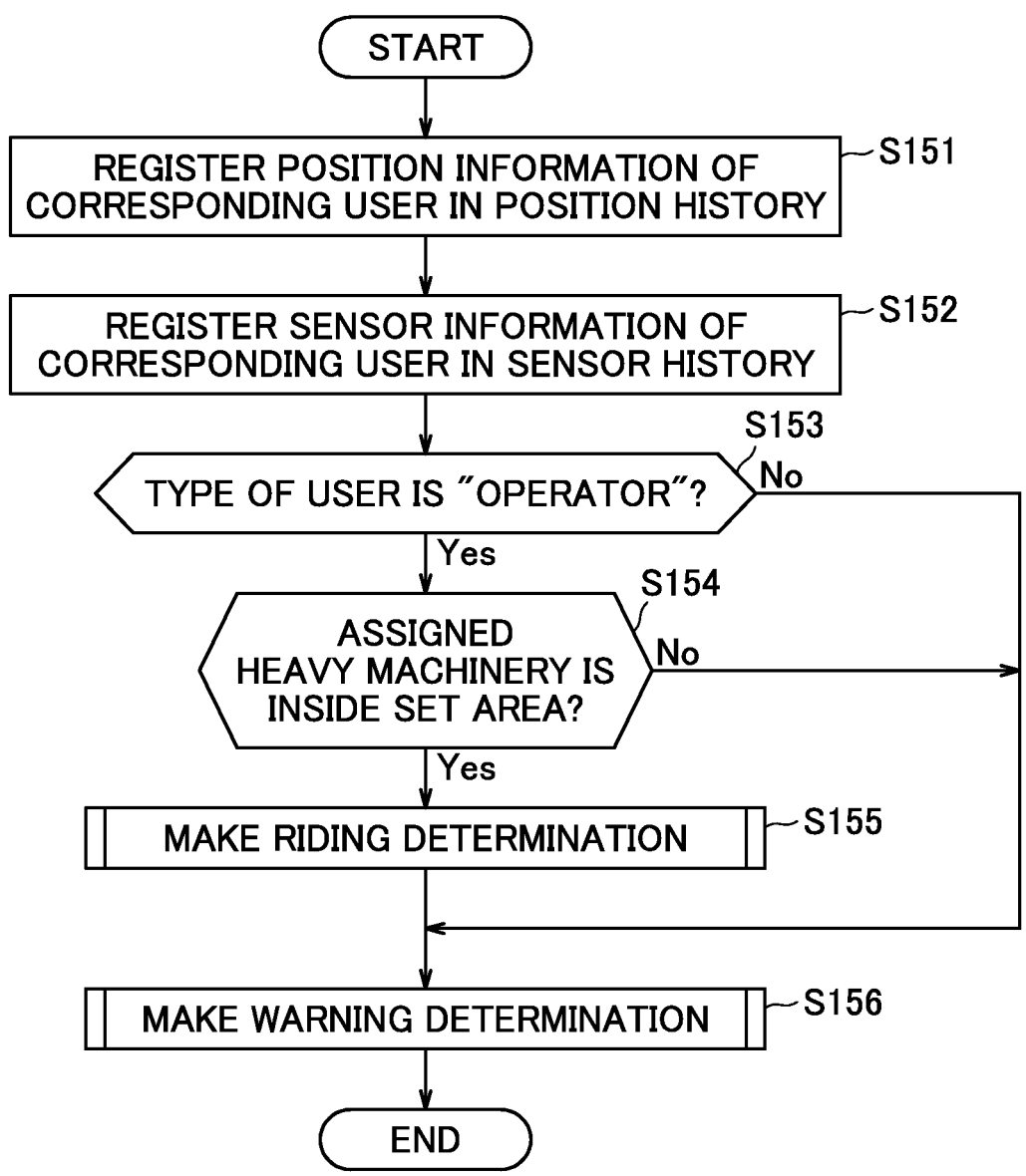
FIG. 16 is a flowchart during data registration in the site management system according to Example 2 of the present invention.

Also, as illustrated in FIG. 16, compared to the process flow in Example 1, the process flow in the site management system according to the present Example does not determine whether the target heavy machinery and the corresponding user are at a fixed distance from each other (step S95), but the rest of the process content is the same. In other words, in the present Example, because real-time position information about the heavy machinery 1 is not supplied to the server 17, an accurate determination of the distance between the heavy machinery 1 and the corresponding user is not made, and instead the already-registered information in the site information 232 is used to issue a warning using each communication terminal.

EXPLANATION OF REFERENCE SIGNS

1 heavy machinery
2 transporting machine
3 worker
4 operator
11 communication terminal
11*a* display
12 communication terminal
12*a* display
13 communication terminal
13*a* display
14 communication terminal
14*a* display
15 base station
16 public communication channel
17 server
18 satellite positioning system
19 operation terminal
201 CPU
202 communication I/F
203 internal bus
204 memory
205 storage
211 first server program
212 second server program
221 information registration function (information registration unit)
222 riding determination function (riding determination unit)
223 warning determination function (warning determination unit)

The invention claimed is:

1. A site management system comprising communication terminals provided in a construction machine and carried by a construction machine operator, a server that acquires information about the construction machine and the construction machine operator at a construction site through a communication channel from the communication terminals and manages work conditions at the construction site, wherein
the server includes:
a CPU that executes a server program having an information registration unit that acquires and registers position information, acceleration data, and gyro data of the construction machine and the construction machine operator from each of the communication terminals and a riding determination unit that determines a proximity state between the construction machine and the construction machine operator by determining whether or not a relative distance therebetween is within a fixed value from the position information of the construction machine and the construction machine operator, and determines whether or not the construction machine operator is riding the construction machine and a riding state by calculating a delimited frequency component for each of a plurality of fixed periods of time from the acceleration data and the gyro data of the construction machine and the acceleration data and the gyro data of the construction machine operator registered by the information registration unit, respectively, in addition to the proximity state, and
a storage that stores the position information, the acceleration data, the gyro data, and user information of a user who carries a communication terminal registered by the information registration unit;
wherein the riding determination unit determines that the construction machine operator is riding the construction machine and a detailed status of the construction machine on which the operator is riding as the riding state when an amount of change in a moving average of the acceleration data of the construction machine operator is on or under a predetermined threshold value, and when a frequency component of the gyro data of the construction machine operator matches a frequency of turning properties of the gyro data of the construction machine or when a frequency component of the acceleration data of the construction machine operator matches a frequency of vibrating properties of the acceleration data of the construction machine, and
wherein the server executes a warning determination function that selects the communication terminal to which a warning should be output based on the riding state determined by the riding determination unit, the position information and the user information stored in the storage, and outputs the warning to the selected communication terminal, or a daily report creation function that performs classification based on the riding state, the position information and the user information stored in the storage to create a daily report, and outputs the daily report to a communication terminal used by an administrator.

2. The site management system according to claim 1, wherein
the server includes a warning determination unit to perform the warning determination function that, in a case of determining that the construction machine operator is riding the construction machine, determines whether or not to issue a warning to a communication terminal provided in the construction machine or carried by the construction machine operator regarding proximity with a worker at the construction site.

3. The site management system according to claim 2, wherein
in a case of issuing the warning to the communication terminal provided in the construction machine or carried by the construction machine operator regarding the proximity with the worker at the construction site, the warning determination unit also issues a warning to a communication terminal carried by the worker regarding proximity with the construction machine.

4. The site management system according to claim 1, wherein
the server includes a daily report creation unit to perform the daily report creation function that creates a daily report about the construction machine operator.

* * * * *